(12) United States Patent
Moe

(10) Patent No.: US 9,922,583 B1
(45) Date of Patent: Mar. 20, 2018

(54) VEHICLE PROJECTION SYSTEM

(71) Applicant: Tyler Moe, Phoenix, AZ (US)

(72) Inventor: Tyler Moe, Phoenix, AZ (US)

( * ) Notice: Subject to any disclaimer, the term of this patent is extended or adjusted under 35 U.S.C. 154(b) by 0 days.

(21) Appl. No.: 15/393,219

(22) Filed: Dec. 28, 2016

(51) Int. Cl.
| | |
|---|---|
| *G03B 21/64* | (2006.01) |
| *G09F 19/18* | (2006.01) |
| *B60R 11/02* | (2006.01) |
| *G09F 21/04* | (2006.01) |
| *G03B 29/00* | (2006.01) |
| *G03B 21/14* | (2006.01) |
| *B60R 11/00* | (2006.01) |

(52) U.S. Cl.
CPC .............. *G09F 19/18* (2013.01); *B60R 11/02* (2013.01); *G03B 21/145* (2013.01); *G03B 21/64* (2013.01); *G03B 29/00* (2013.01); *G09F 21/04* (2013.01); *B60R 2011/0028* (2013.01)

(58) Field of Classification Search
CPC .................................. G03B 21/64; H04N 1/00
See application file for complete search history.

(56) References Cited

U.S. PATENT DOCUMENTS

| | | | | |
|---|---|---|---|---|
| 5,401,190 A | * | 3/1995 | Gandhi ..................... | H01J 5/56 439/613 |
| 2004/0080665 A1 | * | 4/2004 | Lovell ..................... | H04N 7/18 348/373 |
| 2008/0297726 A1 | * | 12/2008 | Rodriguez, Jr. ........ | G03B 21/14 353/13 |

* cited by examiner

*Primary Examiner* — Sultan Chowdhury
*Assistant Examiner* — Danell L Owens
(74) *Attorney, Agent, or Firm* — RG Patent Consulting, LLC; Rachel Gilboy

(57) ABSTRACT

The present invention provides a vehicle window projection system that includes projection devices, mounting devices, image processing unit, and a projection film. The projection device is used to project an image onto the projection file thereby displaying an image on a window with the projection film attached thereto. The projection device can include a projector housing rotatably mounted to a mounting bracket that is mounted to a panel in the vehicle.

8 Claims, 3 Drawing Sheets

VEHICLE PROJECTION SYSTEM

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of vehicle projection systems and methods and more specifically relates to a vehicle projection system for projecting multimedia content on a vehicle window, which may be used for advertising purposes.

DESCRIPTION OF THE RELATED ART

Automobiles are sometimes exhibited for promotional reasons in arenas such as malls, car shows, car dealerships, casinos, and event promotions. When exhibited in this manner, the various areas of the automobile (particularly the automobile windows and windshield) are often used to display the intended promotional message. Typically, these messages are conveyed or displayed via stationary words or pictures fixed to the chosen area of the automobile. It would be desirable, however if promotional images could be displayed in a manner that would better convey the promotional message.

As individuals have become more and more mobile, companies have turned to the use of large print advertisements displayed in retail areas or along heavily traveled highways. Retailers will often advertise their products within a shopping area, such as a mall, to attract customers to their stores. However, many businesses rely on advertising at locations remote from their place of business. Often these retailers will place advertisement along major highways in an attempt to induce customers to visit their location off of the highway. Technology has advanced within the last decade to allow for rotating billboards. These displays allow for more than one company to place their advertisement on a single billboard, and the image rotates at a pre-determined time interval. Some companies have also begun to employ electronic billboards that display various ads on LED, LCD, or other types of display screens. Rotating and electronic billboards, while more effective than single image billboards, cannot be changed in real time with changes in the area.

In addition to billboards or other signage in retail areas, companies may also use their own delivery trucks to advertise their products while they are in transit. Still, other retailers may place their information on independently owned vehicles simply for advertising purposes. Customers can view the vehicles while traveling on the highway and this viewing can increase brand recognition. Currently, vehicles can be painted with the advertisement or fitted with a billboard advertisement on the side of the vehicle. While many consumers may view the vehicle while traveling on the roadway, the signage is difficult to change if a different message is desired.

Various attempts have been made to solve the above-mentioned problems such as those found in WO 2008/019105 to Lanham and U.S. Pat. No. 6,178,677 to Williams. This art is representative of vehicle display devices. None of the above inventions and patents, taken either singly or in combination, is seen to describe the invention as claimed.

Ideally, a new system for delivering advertising content should provide a means for display such content on a vehicle window and, yet would operate reliably and be manufactured at a modest expense. Thus, a need exists for a reliable vehicle projection system to avoid the above-mentioned problems.

BRIEF SUMMARY OF THE INVENTION

In view of the foregoing disadvantages inherent in the known vehicle display devices art, the present invention provides a novel vehicle projection system. The general purpose of the present invention, which will be described subsequently in greater detail is to provide a vehicle projection system for projecting multimedia content on a vehicle window.

The present invention essentially is a vehicle projection system having at least one projection device and at least one projector film. The projection device can be mountable to a portion of a vehicle. The projection device can include at least one projector unit having a configuration capable of projecting an image. The projection film can be secured to a window of the vehicle, and can have a configuration capable of displaying the image projected from the projection device.

The projection device can further include a mounting bracket mountable to the portion of the vehicle, and a projector housing rotatably mounted to the mounting bracket.

The mounting bracket can further include an annular bracket lip in a spaced relationship with a surface of the mounting bracket defining an annular bracket notch. The projector housing can further include an annular housing lip in a spaced relationship with a surface of the projector housing defining an annular housing notch.

The housing lip can have a configuration capable of being received in the bracket notch, and the bracket lip can have a configuration capable of being received in the housing notch.

The vehicle projector housing can define an interior cavity capable of receiving and supporting the projector unit. The projector unit can be pivotably supported in the interior cavity.

Still further, the bracket lip can further include one or more bracket teeth, and the housing lip can further include one or more housing teeth. The bracket teeth and the housing teeth can have a configuration capable of being engageable with each other.

The bracket teeth can be a plurality of radially arranged bracket teeth, and the housing teeth can be a plurality or radially arranged bracket teeth. The housing teeth and the bracket teeth can have a configuration capable of allowing the projector housing to incrementally rotate.

Even still further, the vehicle projection system can further include a remote device including at least one processor in communication with the projector unit, and a display in communication with the processor. The processor can have a configuration capable of controlling an operation of the projector unit.

The remote device can further include at least on battery in communication with the processor, at least one communication module in communication with the processor, and at least one input in communication with the processor. The processor can have a configuration capable of controlling receipt of power from the battery or a vehicle battery.

The present invention holds significant improvements and serves as a vehicle projection system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, vehicle projection system constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a content display system and more particularly to a vehicle projection system as used for projecting multimedia content on a vehicle window.

The present invention provides a window projection system that includes projection devices, mounting devices, lenses/optics, image processing unit, image supply devices (remote device), projection film or projecting surface and power supply. The projection device is used to project an image onto a projecting surface such as, but not limited to, a window with a projection film attached thereto. In an exemplary embodiment, these projecting surfaces/windows are the windows of a vehicle such as, but not limited to, a car, truck, van, trailer, camper, airplane, helicopter, lighter than air vehicle, boat. It can be appreciated that the vehicle projection system can be used to project an image onto any transparent surface such as, but not limited to, a building window, a glass ceiling, a glass floor, etc. The components of the window projection system are described herein below and in the figures.

Figure 1:
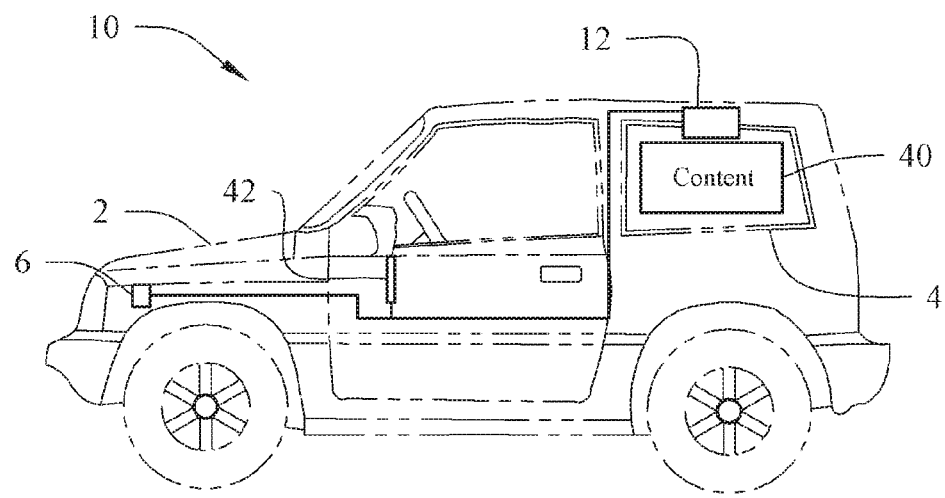
FIG. 1 shows a side view illustrating a vehicle projection system according to an embodiment of the present invention.
Figure 2:
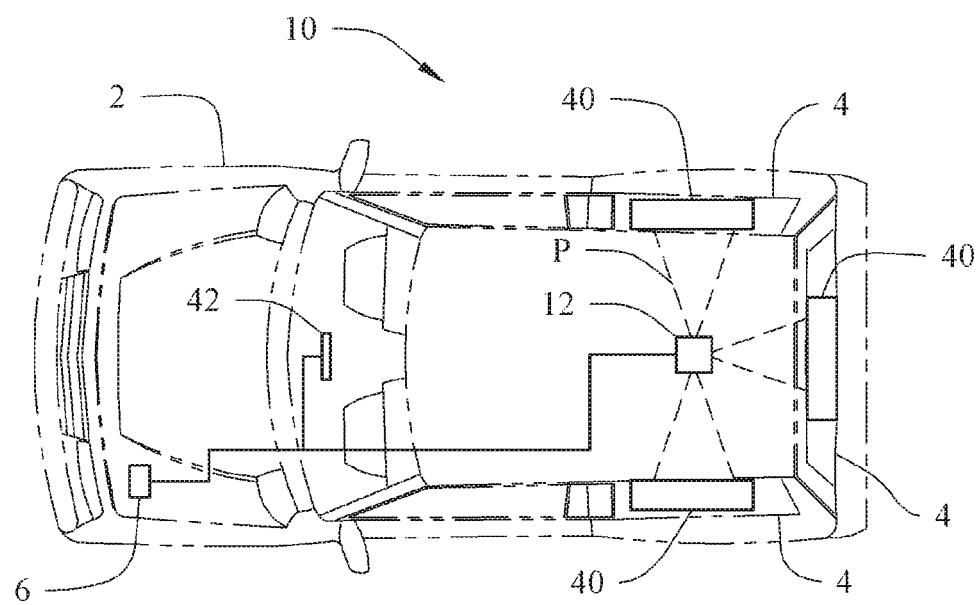
FIG. 2 is a top elevational view illustrating a vehicle projection system according to an embodiment of the present invention of FIG. 1.

Referring to the drawings by numerals of reference there is shown in FIGS. 1 and 2, a vehicle projection system 10 can be associated with a vehicle 2 including a vehicle battery 6 and at least one window 4. The vehicle projection system 10 can include a projection device 12, and a remote device 42. The projection device 12 can be positioned in the vehicle 2 to project an image or content P onto a film 40 adhered to an interior side of the window 4. It can be appreciated that the projection device 12 can be mounted to a ceiling panel, a side panel, a seat or a floor of the vehicle 2. The location of the projection device 12 can be anywhere in the interior of the vehicle 2 so that an image can be projected toward at least one of the windows 4 of the vehicle 2. The vehicle projection system 10 can be powered by the vehicle battery 6.

Figure 3:
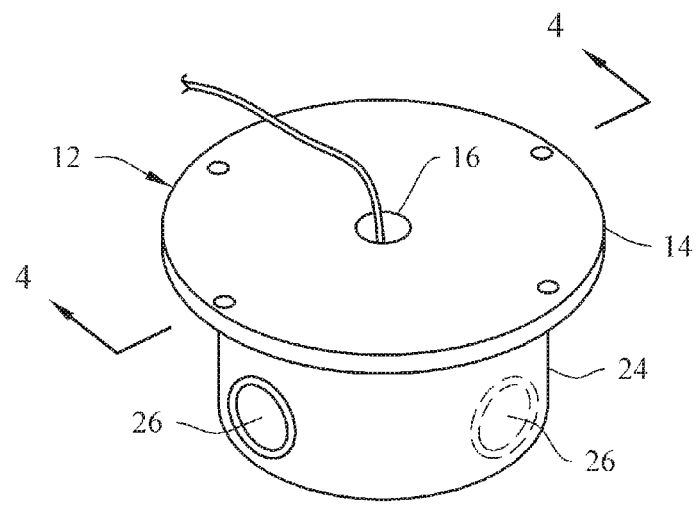
FIG. 3 is a perspective view illustrating a projector unit according to an embodiment of the present invention of FIG. 1.

Referring now to FIG. 3, the projection device 12 can include a mounting bracket 14 for securing the projection device 12 to a surface or panel in the vehicle 2, and a projector housing 24 rotatable mounted to the mounting bracket 14 so that the projector housing 24 can be aimed to any window 4 of the vehicle 2. The mounting bracket 14 can include a bracket opening 16 therethrough capable of receiving and passing a wire or wire harness, and can be attached to the vehicle 2 by way of fasteners, adhesive, clips, clamps, magnets, latches, vacuum, etc.

Figure 4:
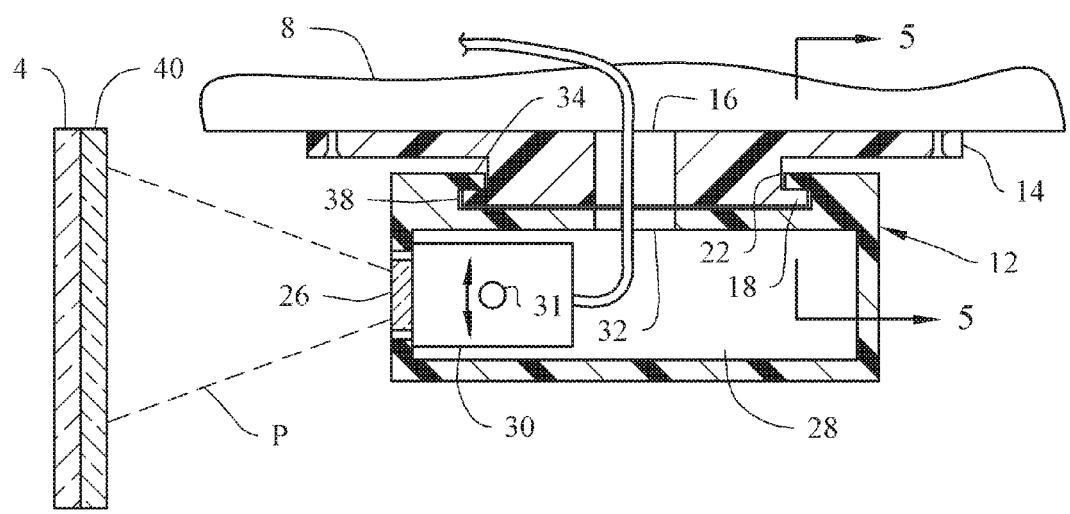
FIG. 4 is a cross-sectional view illustrating the projector unit taken along line 4-4 of FIG. 3.

Referring now to FIG. 4, the mounting bracket 14 can further include an annular bracket lip 18 in spaced relation which the mounting bracket 14 so as to define an annular bracket notch 22.

The projector housing 24 can include at least one lens or optics 26, a defined interior cavity 28, a projector unit 30, and a defined housing opening 32. The projector unit 30 can be any projection device capable of projecting an image onto a surface. The projector unit 30 located in the interior cavity 28 adjacent the optics 26, with a wire or wire harness of the projector unit 30 passing through the housing opening 32 and the bracket opening 16.

It can be appreciated that the optics 26 and the projector unit 30 are combined into a single unit, with the projector unit 30 being mounted to the projector housing 24 by way of a pivot member 31. The pivot member 31 can have a configuration capable of allowing the projector unit 30 to pivot within the interior cavity 28, and thereby changing the angle of projection of the image P.

The projector housing 24 can further include an annular housing lip 34 in spaced relation which a top wall of the projector housing 24 or with the interior cavity 28 so as to define an annular housing notch 38. The housing lip 34 has a configuration capable of being received in the bracket notch 22, and the bracket lip 18 has a configuration capable of being received in the housing notch 38. It can be appreciated that the since the bracket lip 18, the bracket notch 22, the housing lip 34 and the housing notch 38 are all annular, then the projector housing 24 can rotate about the mounting bracket 14 so as to aim the projected image P against the film 40 adhered or secured to the window 4.

The film 40 can be any film or sheet with projection capabilities such as, but not limited to, 3M™ Projection Screen Whiteboard Film PWF-500.

Figure 5:
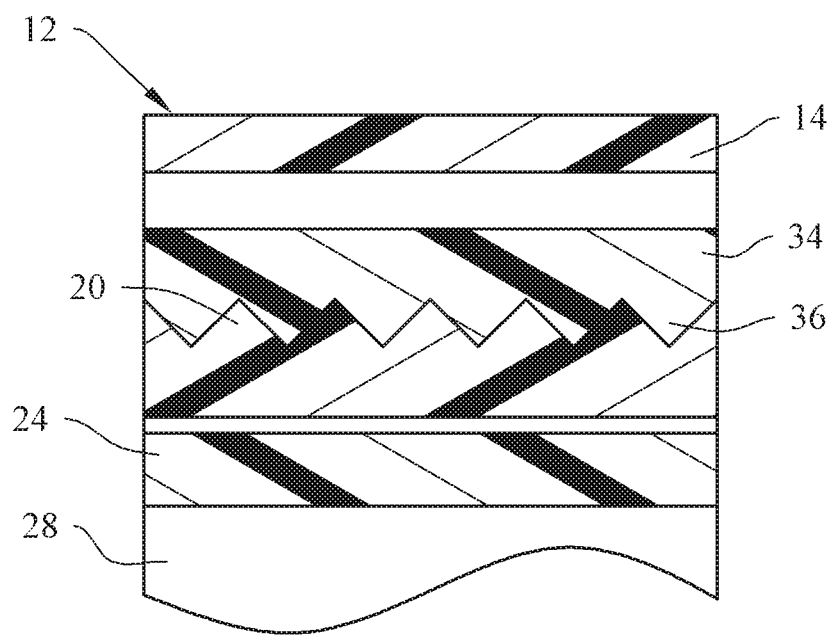
FIG. 5 is a cross-sectional illustrating the projector unit taken along line 5-5 of FIG. 4.

Referring now to FIG. 5, the projector housing 24 can incrementally rotate about the mounting bracket 14, and locking in position by way of engageable teeth. The bracket lip 18 can include a plurality of radially spaced bracket teeth 20, and the housing lip 34 can include a plurality of radially spaced housing teeth 36. A space is defined between an upper portion of the housing lip 34 and the mounting bracket 14 sufficient to allow the projector housing 24 to slide within the bracket notch 22. The space further allows the housing teeth 36 to move up and over the bracket teeth 20, thereby allowing the projector housing 24 to rotate freely until a desired orientation is reached. At which point, the projector housing 24 can be moved into a retained position with the bracket teeth 20 and the housing teeth 36 engaged.

It can be appreciated that the bracket teeth 20 and the housing teeth 36 can have any configuration allowing for engagement therebetween that retains the projector housing 24 in a desired orientation. It can further be appreciated that a lock means (not shown) can be used to lock or secure the projector housing 24 in the desired orientation.

Figure 6:
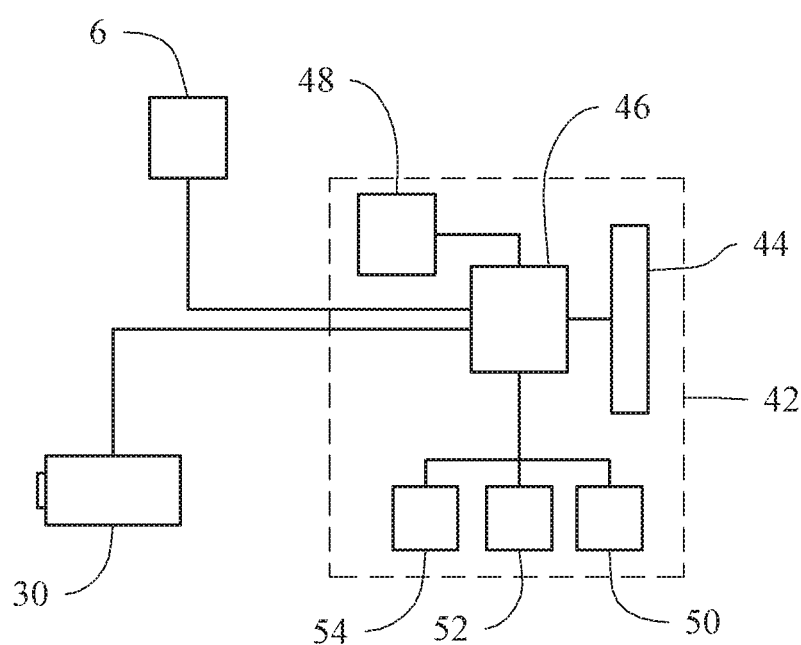
FIG. 6 is a schematic view of the electrical components of the vehicle projection system according to an embodiment of the present invention of FIGS. 1-5.

Referent now to FIG. 6, the remote device 42 can include a display 44 and electrical components capable of operating and controlling the vehicle projection system. The electrical components can be, but not limited to, a processor module 46, a power source 48, at least one input 50, at least one communication module 52, and at least one memory module 54.

The processor module 46 is in communication with the vehicle battery 6, the projector unit 30, the power source 48, the input 50, the communication module 52, and the memory module 54. The processor module 46 can include, but not limited to, a processor, control buses, memory, and other electrical components to provide operation of the remote device 42.

The display 44 can be a display device capable of displaying an image and/or accepting touch inputs such as, but not limited to, a touch display. The power source 48 can be, but not limited to, at least one battery, at least one rechargeable battery, at least one solar panel or at least one generator. The power source 48 is capable of providing power to the remote device 42 and the projection device 12 when power is not available or not wanted from the vehicle battery 6.

The input 50 can be, but not limited to, a keyboard, a touch screen, a mouse, a universal serial bus (USB) or any communication input port. The communication module 52 can be, but not limited to, an Ethernet means, a transmitter, a transceiver, a Bluetooth™ means or a cellular means.

The remote device 42 can also include a plurality of input/output ports or jacks which can be used to couple a sound/video image source, such as emanating from a video player (e.g. DVD player, VCR, MPEG player, gaming system, or computer), to the projection device 12. The input/output ports or jacks can be configured to receive standard electronic connectors (e.g. USB, RCA plugs, s-video, HDMI, etc.). The projection device 12 may also include speakers (not shown) and audio output jacks in addition to, or in place of, the speakers, in order to output sound via external speakers (not shown). The communication module 52 can have a configuration capable of wirelessly connecting the projection device 12 to a peripheral device, such as a navigation system, dashboard entertainment system, smartphone, laptop, DVD player, VCR, MPEG player, gaming system, and computer.

It can be appreciated that the remote device 42 can be included in the interior cavity 28, with the display 44 located remotely in the vehicle 2, such as on or attached to a dashboard or central console.

It can further be appreciated the vehicle projection system 10 may be sold as retrofittable or aftermarket kit comprising the projection device 12 and the remote device 42. The kit has instructions such that functional relationships are detailed in relation to the structure of the invention (such that the invention can be used, maintained, or the like in a preferred manner). Alternatively, the vehicle projection system 10 can be an integral component of the vehicle.

The vehicle projection system 10 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed:

1. A vehicle projection system comprising:
   at least one projection device mountable to a portion of a vehicle, said projection device including at least one projector unit having a configuration capable of projecting an image; and
   at least one projection film securable to a transparent panel of the vehicle, said projection film having a configuration capable of displaying said image projected from said projection device;
   wherein said projection device further includes a mounting bracket mountable to the portion of the vehicle, and a projector housing rotatably mounted to said mounting bracket;
   wherein said mounting bracket further includes an annular bracket lip in a spaced relationship with a surface of said mounting bracket defining an annular bracket notch;
   wherein said projector housing further includes an annular housing lip in a spaced relationship with a surface of said projector housing defining an annular housing notch
   wherein said housing lip has a configuration capable of being received in said bracket notch, and said bracket lip has a configuration capable of being received in said housing notch; and
   wherein said bracket lip further includes one or more bracket teeth, said housing lip further includes one or more housing teeth, said bracket teeth and said housing teeth have a configuration capable of being engageable with each other.

2. The vehicle projection system of claim 1 wherein said projector housing defining an interior cavity, said projector unit is receivable in said interior cavity.

3. The vehicle projection system of claim 2 wherein said projector unit is pivotably supported in said interior cavity.

4. The vehicle projection system of claim 1 wherein said bracket notch has a configuration capable of allowing said housing lip to move within said bracket notch so as to allow said housing teeth to disengage with said bracket teeth.

5. The vehicle projection system of claim 4 wherein said bracket teeth is a plurality of radially arranged bracket teeth, said housing teeth is a plurality or radially arranged bracket teeth, said housing teeth and said bracket teeth have a configuration capable of allowing said projector housing to incrementally rotate.

6. The vehicle projection system of claim 5 further comprising a remote device including at least one processor in communication with said projector unit, and a display in communication with said processor, said processor having a configuration capable of controlling an operation of said projector unit.

7. The vehicle projection system of claim 6 wherein said remote device further includes at least on battery in communication with said processor, at least one communication module in communication with said processor, and at least one input in communication with said processor.

8. The vehicle projection system of claim 7 wherein said processor has a configuration capable of controlling receipt of power from said battery or a vehicle battery.

* * * * *